(No Model.)
F. J. G. FROMHOLT.
MECHANICAL SAWING AND MOLDING STONE, MARBLE, &c.
No. 518,029. Patented Apr. 10, 1894.
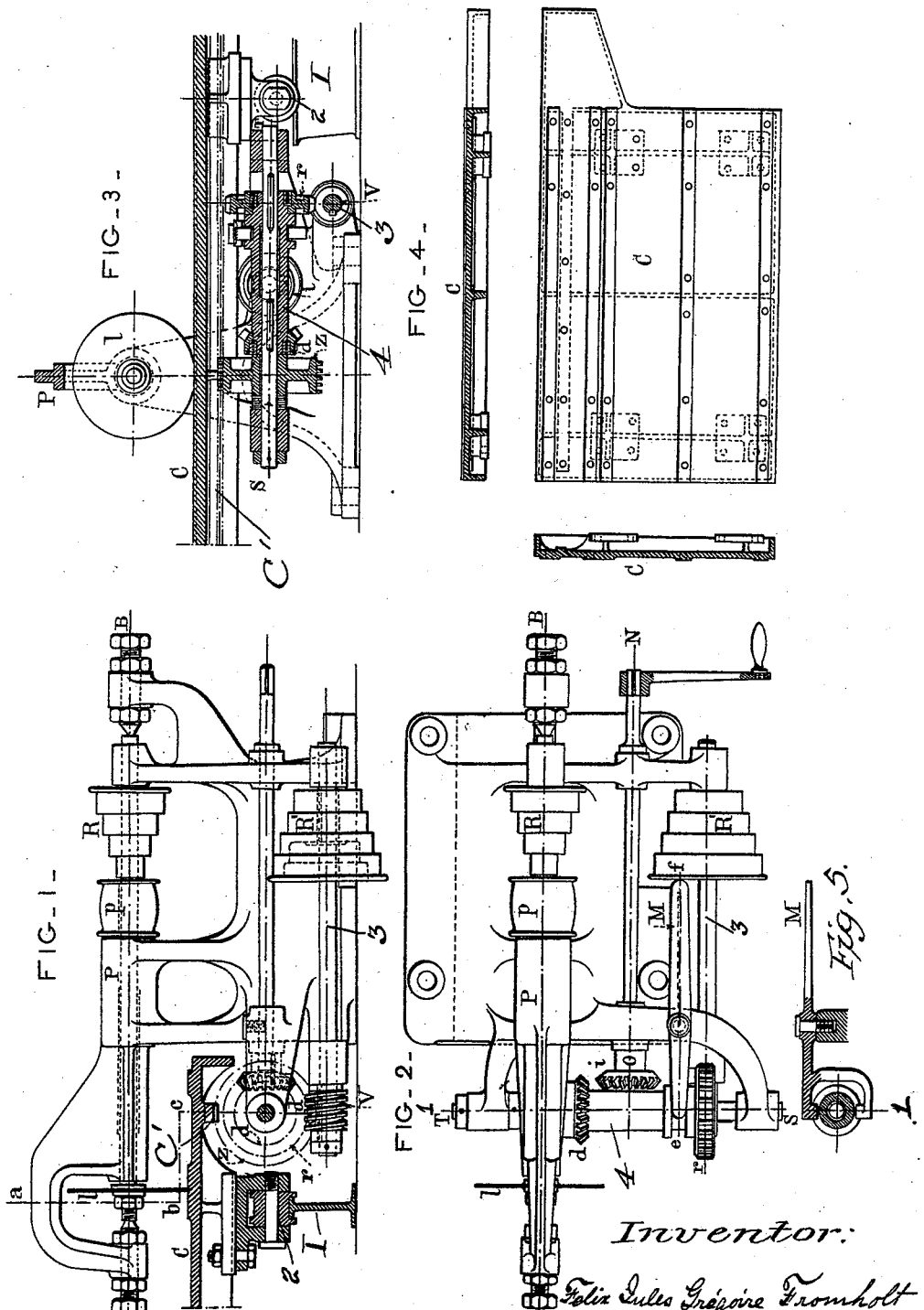
Witnesses:
E. B. Bolton
D. J. Jones
Inventor:
Felix Jules Grégoire Fromholt
By Renard & R
his Attorneys.

UNITED STATES PATENT OFFICE.

FÉLIX JULES GRÉGOIRE FROMHOLT, OF PARIS, FRANCE.

MECHANICAL SAWING AND MOLDING STONE, MARBLE, &c.

SPECIFICATION forming part of Letters Patent No. 518,029, dated April 10, 1894.

Application filed April 19, 1892. Serial No. 429,775. (No model.) Patented in France November 25, 1891, No. 217,651.

*To all whom it may concern:*

Be it known that I, FÉLIX JULES GRÉGOIRE FROMHOLT, a citizen of the Republic of France, residing at Paris, France, have invented certain improvements in relation to the mechanical setting and mounting of diamonds or other hard substances, as well as the application of this process to several new machines for sawing and molding stone, marble, and the like, (for which invention I have received Letters Patent in France, No. 217,651, dated November 25, 1891,) of which the following is a specification.

My invention relates to machines for sawing stone and the like and some features of my invention are applicable to all kinds of machines in which the material to be operated on is placed on a reciprocating carriage and moved to and from the saw or other tool adapted to perform the desired work.

My present machine is intended to supply the needs of small manufacturers and combines in one machine connections for operating the carriage by power or by hand.

In the drawings, Figure 1, is a side view of the machine partly in section. Fig. 2, is a plan view; Fig. 3, a sectional view through the carriage and part of its operating connections. Fig. 4, shows details relating to the carriage, and Fig. 5, is a detail view of a shifting lever.

The machine includes a suitable frame with suitable bearings and a standard P, traversed by an axle A. B. upon which the saw blade 1 is located the diameter of which must not exceed twenty centimeters. The axle is held by two conical screws to reduce the friction. The blade is actuated by the pulley p located upon the axle A. B. which is in its turn actuated through any suitable connection. The stone or other object that must be sawed is fixed upon the sliding carriage C supported by rollers 2 only one of which is shown which rolls over irons I. The advancing of the carriage depends upon the number of revolutions of the blade. A graduated pulley R located upon the axle A. B. of the blade actuates the graduated pulley R' which is located upon an axle 3 parallel to A. B. and which carries at its extremity a helicoidal screw V that engages in a worm wheel r fixed upon a sliding sleeve 4 traversed by an axle S T on which the sleeve slides which axle carries a helicoidal screw Z engaging a rack C' fixed under the carriage C. The advancing movement is regulated by adjusting the strap upon the graduated pulleys R R'. The stopping of the advancing movement and the starting of the backward is effected by acting upon the lever M for displacing the sleeve 4 to free the cog wheel r from the helicoidal screw V and for the putting in contact the two beveled pinions d i, the pinion d being rigid or integral with the sleeve while the pinion i is upon the axle O. N. perpendicular to the direction of movement of the carriage. A device as the crank shown is fixed to the extremity of the axle O. N. and this enables the workman to give a fore or backward motion to the carriage. Any desired form of tool may be substituted for the saw shown. By this mechanism the carriage can be operated by hand or by power.

I claim—

1. In a sawing or like machine the rotary tool, the shaft therefor, the band pulleys R thereon, the reciprocating work supporting table, a shaft 3 parallel with the tool carrying shaft, the band pulleys thereon to receive belts from the pulleys R a worm V on the end of the parallel shaft, the rack on the work table, the worm wheel meshing therewith the shaft supporting said wheel, the sliding sleeve thereon having a worm wheel to engage and disengage the worm V, said sleeve having also a pinion d, the shaft O N, with means for operating it and the pinion i thereon adapted to engage the pinion d of the sleeve when said sleeve is shifted to disengage the worm wheel r from the worm V, substantially as described.

2. In combination, the work tool the reciprocating carriage having a rack, the gearing in engagement with said rack including a sliding sleeve arranged to connect and disconnect the parts of the driving train, said sleeve carrying also a pinion d and the supplemental shaft O N, with operating means therefor said shaft having a pinion i to engage the pinion d when the sliding sleeve is shifted to disconnect the main driving train, substantially as described.

In witness whereof I hereunto set my hand in presence of witnesses.

FÉLIX JULES GRÉGOIRE FROMHOLT.

Witnesses:
ROBT. M. HOOPER,
PAUL RUBER,
GASTON EVRAT.